April 26, 1960     T. J. LAWLOR     2,933,841
HIGHWAY DISTRESS SIGNAL
Filed April 10, 1959
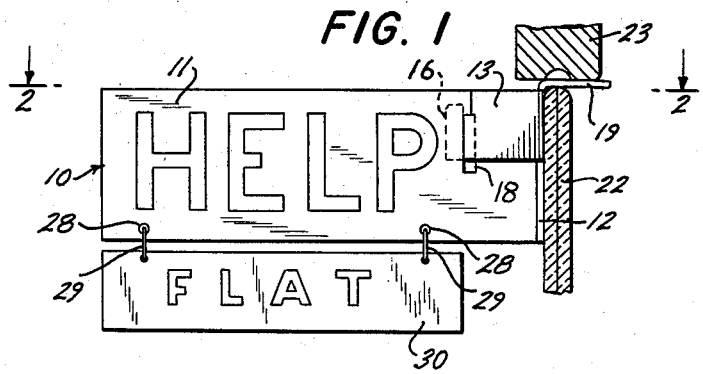
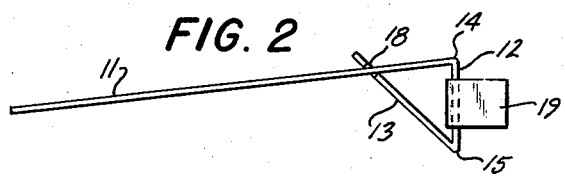
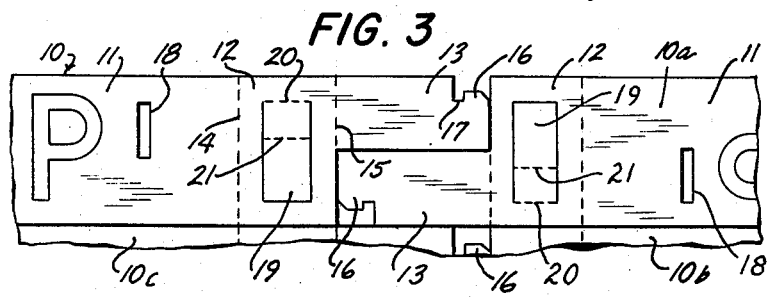
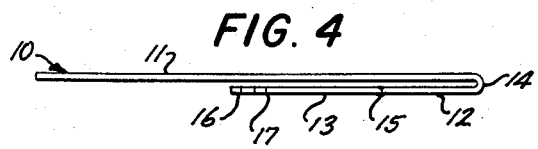
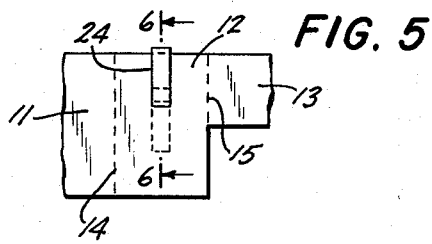
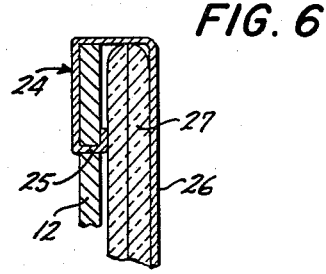
INVENTOR.
THOMAS J. LAWLOR
BY
Howard E. Thompson Jr
ATTORNEY.

United States Patent Office 2,933,841
Patented Apr. 26, 1960

2,933,841

HIGHWAY DISTRESS SIGNAL

Thomas J. Lawlor, Hohokus, N.J.

Application April 10, 1959, Serial No. 805,483

5 Claims. (Cl. 40—129)

This invention relates to highway distress signals of knock-down structure which can be readily assembled and visibly displayed when a motor vehicle is in distress. More particularly, the invention relates to a distress signal of the character described which is mountable in conjunction with a vehicle window for clear visibility from positions both ahead of and behind a vehicle.

An increasingly developing problem in motor travel, and particularly on the super highways, is to provide effective means for indicating when a vehicle parked, or off the road, is in distress. An improvised signal means which has been proposed on certain of the super highways is to tie a white handkerchief on a door handle and wait for a patrol car to arrive. While such recognizable method of signaling is of some value, it is completely uninformative, and, depending upon weather conditions, time of day, and the like, may not be readily visible.

An object of the present invention is to provide a flexible and convenient, yet inexpensive, highway distress signal which can be handily stored within the driver's compartment of a motor vehicle in a flat or knock-down condition, and which can be readily assembled for mounting in conjunction with a vehicle window to protrude outwardly from the window, and provide an informative distress signal, readily visible, even under adverse conditions, from substantial distances behind and ahead of the vehicle.

Regarded in certain of its broader aspects, the highway distress signal in accordance with the present invention comprises an elongated panel section carrying a message of distress on both faces thereof, an integral bearing section foldable with respect to the panel section carrying deformable means for engagement with a vehicle window structure, and a locking section integral and foldable with respect to said bearing section and having locking engagement with said panel section to dispose said panel section in an outwardly projecting position with respect to the plane of said bearing section. Preferably, the panel section also includes at the lower portion thereof, means facilitating attachment of interchangeable panel members having opposed surfaces thereof imprinted with more specific messages of distress.

Novel features of the highway distress signal, in accordance with the present invention, will be readily apparent from a consideration of the following description, taken together with the accompanying drawing, in which preferred adaptations of the distress signal have been clearly illustrated in the several views with the various parts thereof identified by suitable reference characters in each of the views, and in which:

Fig. 1 is a plan view of a highway distress signal in accordance with the invention in assembled position with the mounting thereof in conjunction with a vehicle window indicated in section;

Fig. 2 is a top view of the distress signal as shown in Fig. 1, substantially on the line 2—2;

Fig. 3 is a plan view of a portion of a large sheet of material showing how a plurality of distress signals can be produced at one time with a minimum of material loss;

Fig. 4 is a view similar to Fig. 2, but showing the distress signal collapsed to inoperative position;

Fig. 5 is a fragmentary view similar to Fig. 3, showing a signal device in which the bearing section carries a modified form of a vehicle window engaging means; and Fig. 6 is a fragmentary view, substantially on the line 6—6 of Fig. 5, showing the same in assembled relation to the upper edge of a vehicle window.

As shown in the drawing, the highway distress signal comprises a unitary body of sheet material 10 providing a panel section 11, a bearing section 12, and a locking section 13, suitably foldable along the lines 14 and 15, as clearly indicated in Figs. 2 and 3 of the drawing. The locking section 13 is preferably of a width substantially one-half that of the panel section 11 and the bearing section 12, and having a common upper edge therewith; and the free end of the locking section is cut out adjacent the upper edge to provide a tab 16 and notch 17. The panel section 11 is provided with an elongated cutout 18 spaced from the foldable line 14 to receive the tab 16 when the upper edge of the locking section 13 is deflected slightly downwardly with respect to the upper edge of the panel section. Such downward flexure is released when the tab 16 has been inserted into the aperture 18 to permit engagement of the notch 17 with the upper edge of the aperture 18 to thereby provide a firm bracing of the panel section 11 in an outwardly projecting position with respect to the bearing section 12 as will be evident from a consideration of Fig. 2.

The bodies 10 of sheet material and the integral sections 11, 12 and 13 thereof can be fashioned from any suitable rigid material, such for example, as corrugated board, cardboard, or even plastic or metal sheeting made suitably foldable along the lines 14 and 15. Since low cost is a primary factor in encouraging extensive use of a device of this type and kind, it is preferable to employ most economical material, such as cardboard or corrugated board, and it will be evident from a consideration of Fig. 3 of the drawing, that large sheets of such material can be divided into a plurality of blanks or bodies 10, 10a, 10b, 10c, etc. with the only loss of material being cutouts for the aperture 18 and for the shaping of the tab 16 and notch 17.

For mounting purposes in conjunction with a vehicle window, the bearing section 12 is suitably provided with a cutout tab 19, foldable along the lines 20, 21 around the upper edge of the bearing section 12 to dispose the tab 19 in a rearwardly extended position with respect to the panel section 12 so that the same may be brought into clamping engagement between a roll-up window 22 and a window frame 23 as clearly shown in Fig. 1 of the drawing. It will be noted that the tab 19 is of sufficient length to be engaged by the fingers while the device is oriented on the outside of the window 12 and clamped against the window frame 23, making it unnecessary to leave the vehicle in order to display the distress signal. Prior to use and between uses of the distress signal, the tab 19 will be disposed substantially in the plane of sheet of blank 10, permitting flat folding of the device in the compact manner as shown in Fig. 4 of the drawing.

In Figs. 5 and 6 there is shown a slight modification wherein the tab 19 is replaced by a deformable metal or other strip 24, having one end 25 suitably anchored to, or embedded in the bearing section 12 with the other elongated end 26 being deformable to provide close clamping engagement with a support, such as the window 27 as shown in Fig. 6. When the device is not in use, the elongated end 26 of the strip 24 will be deformed to lie closely against the surface of the bearing section 12.

As shown in Fig. 1 of the drawing, the panel section 11 carries a boldly displayed distress message "Help" which is suitably an adherent film or deposit of a colored and fluorescent material which will provide sharp contrast with the background in the daylight, and which will clearly reflect incident light at night. It will be understood that the distress message, such as the word "Help" will appear on both surfaces of the panel section 11, and it will further be understood that any distress message can be applied to the device, the word "Help" being shown merely for illustrative purposes.

The panel section 11 preferably is provided with spaced apertures 28, or the like, adjacent the lower edge thereof to receive suspending means 29 of interchangeable supplementary panels 30 to opposed surfaces of which are applied supplementary distress messages as exemplified by the word "Flat." The suspending means 29 can suitably be fashioned of deformable metal strips similar to the strip 24 previously described.

While the distress signal is a complete and useful device without the supplementary panels 30, it is within the scope of the invention to provide the basic device in combination with a plurality of detachable and interchangeable panels 30 carrying distress messages, such as "Police," "Out of Gas," "Doctor," and the like.

It will be noted that the basic device provides rather extensive surface in the locking section 13, the bearing section 12, and the panel section 11 between the folding line 14 and aperture 18 on which to display advertising matter, instructions for set-up and use of the device, and the like. This, coupled with the simple and inexpensive construction of the device makes it quite feasible as a give-away or premium item for distribution through service stations, toll booths, and other highway facilities. Even when fashioned from more durable materials, adapting the device for reuse over extended periods of time, it will be evident that the device can be manufactured to sell at relatively nominal cost.

As will be evident from the foregoing discussion, the novel highway distress signal in accordance with the present invention is adapted for providing meaningful distress messages, visible at substantial distances from a stranded vehicle, and has the further advantage that it may be readily affixed in operative position without the need for the occupants of the vehicle leaving the vehicle, or exposing themselves to traffic hazards.

Various changes and modifications in the highway distress signal as herein disclosed will occur to those skilled in the art, and to the extent that such changes and modifications are embraced by the appended claims, it is to be understood that they constitute part of my invention.

I claim:
1. A highway distress signal comprising a unitary body of sheet material foldable to provide a panel section, a bearing section contiguous with said panel section and a locking section contiguous with said bearing section, said locking section having tab means at the end thereof cooperating with apertured means in said panel section for locking said panel section in protruding position with respect to said bearing section, arrangement of said bearing section against a vehicle window with one upper edge thereof in alignment with the upper edge of said window providing substantially vertical orientation of said panel section, and deformable means on said bearing section providing operative supporting engagement with the upper edge of said vehicular window.

2. A highway distress signal as defined in claim 1 wherein the deformable means on said bearing section comprises a cutout tab within said bearing section and foldable over the upper edge of said bearing section for clamping engagement between the upper edge of said vehicular window and its cooperating frame part.

3. A highway distress signal as defined in claim 1, wherein the deformable means on said bearing section comprises a deformable strip member secured to said bearing section and adapted to extend over the upper edge of said bearing section and the upper edge of said vehicular window for clip-like engagement of the vehicular window between said strip member and bearing section.

4. A highway distress signal as defined in claim 1, wherein the combined length of said bearing section and locking section is less than the length of said panel section, whereby said unitary body, when folded between said panel and bearing section, collapses to an essentially flat form within the bounds of said panel section.

5. A highway distress signal as defined in claim 1 wherein the upper edges of said panel section, bearing section and locking section fall along a first straight edge of said body of sheet material, the lower edges of said panel section and bearing section fall along a second and parallel straight edge of said body of sheet material, and the lower edge of said locking section is parallel to and equidistant from said first and second straight edges.

References Cited in the file of this patent
UNITED STATES PATENTS

| | | |
|---|---|---|
| 1,785,449 | Kahn | Dec. 16, 1930 |
| 2,795,877 | Falk | June 18, 1957 |

FOREIGN PATENTS

| | | |
|---|---|---|
| 389,697 | France | July 7, 1908 |